United States Patent [19]

Konjedic et al.

[11] 4,409,832
[45] Oct. 18, 1983

[54] DEVICE FOR AUTOMATICALLY INDICATING AN INSUFFICIENT LEVEL OF AUTOMATIC FLUID

[75] Inventors: Oscar Konjedic, Beinasco; Paolo Carrara; Enzo Fabris, both of Turin, all of Italy

[73] Assignee: Fiat Auto S.p.A., Turin, Italy

[21] Appl. No.: 279,293

[22] Filed: Jul. 1, 1981

[30] Foreign Application Priority Data

Jul. 9, 1980 [IT]  Italy ............................... 68082 A/80

[51] Int. Cl.³ ............................................. B60K 41/04
[52] U.S. Cl. ......................................... 73/292; 340/59
[58] Field of Search ................ 73/291, 292; 340/52 F, 340/57, 59, 62, 612, 670

[56] References Cited
U.S. PATENT DOCUMENTS 3,431,779  3/1969  Wilken et al. .......................... 73/291

Primary Examiner—Steven L. Stephan
Assistant Examiner—Joseph W. Roskos
Attorney, Agent, or Firm—Sughrue, Mion, Zinn, Macpeak and Seas

[57] ABSTRACT

A device is provided for automatically indicating an insufficient level of oil in a motor-vehicle gearbox of the automatic type. The device includes an oil level sensing system controlling an associated indicator. To prevent spurious operation of the indicator, the device is provided with a number of sensors arranged to ensure that the oil-level sensing system can only effect control of the indicator under certain predetermined conditions including that the vehicle is stationary and on the level, and that the engine is idling. An oil temperature sensor is also provided either to prevent operation of the indictor if the oil temperature is outside a predetermined range, or to effect a temperature dependent adjustment of the acceptable value of oil level.

5 Claims, 1 Drawing Figure

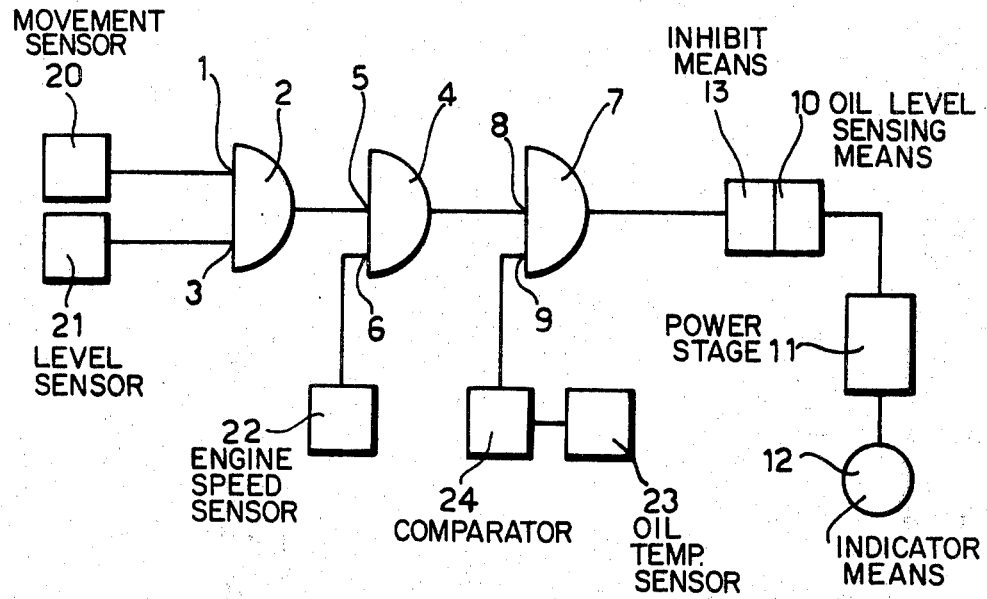

DEVICE FOR AUTOMATICALLY INDICATING AN INSUFFICIENT LEVEL OF AUTOMATIC FLUID

BACKGROUND OF THE INVENTION

The present invention relates to a device for automatically indicating an insufficient level of oil in a motor-vehicle gearbox of the automatic type.

It is known that the oil level in automatic gearboxes usually has to be measured in very precise conditions; the vehicle must be stationary and on the level, the engine must be idling and the oil temperature in the gearbox must be between 30° C. and 90° C.

All this requires a certain amount of care on the part of the person carrying out the oil level check and such inspections are thus normally carried out in a workshop by specialised personnel at appreciable cost and expenditure of time.

The present invention seeks to provide a device for automatically indicating an insufficient level of oil in automatic gearboxes, which avoids the aforesaid drawbacks, is simple to manufacture and of low cost.

SUMMARY OF THE INVENTION

The present invention fulfils these objects by the provision of a device for automatically indicating an insufficient level of oil in automatic gearboxes, which device comprises a first sensor arranged to produce a first enable signal when said vehicle is stationary, a second sensor arranged to produce a second enable signal when said vehicle is on the level, a third sensor arranged to produce a third enable signal when the speed of engine rotation is at a predetermined value, first and second gearbox-oil sensing means respectively arranged to sense the temperature and the level of oil in said gearbox and to generate respective output signals in dependence thereon, indicator means operable to indicate an insufficient level of oil in said gearbox, and control means connected to said sensors, to said sensing means and to said indicating means and operative to cause operation of said indicator means only when all three said enable signals are present and said output signals from the sensing means indicate that the level of oil in said gearbox is insufficient at the oil temperature prevailing.

BRIEF DESCRIPTION OF THE DRAWING

A device embodying the invention will now be described in detail with reference to the attached drawing, supplied by way of non-limiting example, the sole FIGURE of which is a block circuit diagram of the device.

DESCRIPTION OF THE PREFERRED EMBODIMENT

The device shown in block diagram form in the drawing is arranged to automatically indicate an insufficient level of oil in a motor-vehicle gearbox of the automatic type. The device includes a first coincidence circuit 2 having two inputs 1 and 3 respectively fed from a sensor 20 arranged to detect when the motor vehicle is stationary and a sensor 21 arranged to detect when the vehicle is on the level. The sensor 20 is, for example, arranged to detect when the gear lever is in its parking position while the sensor 21 is, for example, a mobile ball indicator mounted on the floor of the vehicle. The sensors 20 and 21 are each arranged to output high logic signals respectively when the vehicle is stationary and when the vehicle is level. When both inputs of the coincidence circuit are simultaneously fed with high signals, this circuit will output a high logic signal to a first input 5 of a second coincidence circuit 4. A second input 6 of the second coincidence circuit 4 is fed with a logic signal indicative of the speed of the vehicle's engine, this signal being high when the engine is running at a speed of approximately 1000 rev/min and low at other engine speeds. The engine speed logic signal can be supplied by any suitable sensor means 22 such as a revolution counter, a phonic wheel, an induction coil sensor arrangement, etc.

If high logic signals are present simultaneously at the inputs of the coincidence circuit 4, this will output a high logic signal to a first input 8 of a third coincidence circuit 7.

A second input 9 of the third coincidence circuit 7 is fed with a high or low logic signal according to whether or not the temperature of the oil in the gearbox is between 30° C. and 90° C.

This information may be supplied for example by sensing means 23, such as a thermometer, whose output, in voltage form, is fed to a window comparator 24 which determines by known methods whether the temperature lies between the aforesaid temperature limits.

If two high logic signals are present at the input of the coincidence circuit 7, a master enabling signal will be supplied therefrom to inhibit means 13 to enable reading of the oil level by a known sensing system 10 which, if the gearbox oil level is lower than a minimum pre-established level, operates an indicator 12 (an indicator light for example) via a power stage 11. The indicator 12 is arranged to remain in the "ON" condition to ensure that the driver's attention is caught. In the absence of a master enabling signal from circuit 7 the inhibit means 13 will prevent sensing means 10 from causing operation of said indicator means 12.

In the foregoing arrangement, the oil level measured is compared with a single predetermined level value; since such a comparison is only suitable within a certain temperature range, the device is arranged to operate only within that range, this being achieved by the provision of the temperature sensing means 23, the comparator 24 and the coincidence circuit 7. As an alternative, either the predetermined level value against which the measured oil level is compared or the measured oil level itself can be adjusted as a function of temperature, such an arrangement being particularly suitable, for example, in harsh climates when starting after a prolonged overnight halt. In such an arrangement, use may be made of a temperature transducer associated with a central electronic unit, which by extrapolation based on the temperature read, enables the determination of the corresponding oil level which would be present if the oil temperature were between the above-mentioned limits of 30° to 90° C.

We claim:

1. In a motor vehicle provided with an engine and an automatic gearbox, a device for automatically indicating an insufficient level of oil in said gearbox, said device comprising:

a first sensor arranged to produce a first enable signal when said vehicle is stationary, a second sensor arranged to produce a second enable signal when said vehicle is on the level, a third sensor arranged to produce a third enable signal when the speed of engine rotation is at a predetermined value, first and second gearbox-oil sensing means respectively arranged to sense the temperature and the level of oil in said gearbox and to generate respective output signals in dependence thereon, indicator means operable to indicate an insufficient level of oil in said gearbox; and control means connected to said sensors, to said sensing means, and to said indicator means and operative to cause operation of said indicator means only when all three said enable signals are present and said output signals from the sensing means indicate that the level of oil in said gearbox is insufficient at the oil temperature prevailing.

2. A device according to claim 1, wherein said control means includes:

a window comparator connected to receive the said output signal which is dependent on the temperature of oil in said gearbox, said comparator being arranged to produce a fourth enable signal when the oil temperature lies between upper and lower threshold temperatures, gating means connected to receive said enable signals and operative to produce a master enabling signal only in the presence of all four said enable signals, and inhibit means connected to said gating means and arranged to prevent said second gearbox-oil sensing means causing operation of said indicator means except when said master enabling signal is present, the output signal from said second sensing means only being effective to operate said indicator means, in the presence of said master signal, if it indicates that the gearbox oil level is below a value predetermined for temperatures between said upper and lower threshold temperatures, the assessment of the sufficiency of oil level being effectively suspended by means of said first sensing means, said window comparator, gating means, and inhibit means for oil temperatures outside the range defined by said threshold temperatures.

3. A device according to claim 2, wherein said inhibit means is arranged to prevent operation of said second gearbox-oil sensing means except in the presence of said master enabling signal.

4. A device according to claim 1, wherein said indicator means is arranged to remain in the "ON" condition once operated.

5. A device according to claim 1, wherein when said three enable signals are present, the control means is arranged to compare the value of said output signal from the second gearbox-oil sensing means with a reference value, the magnitude of one of said values being adjustable by said control means in dependence on the temperature of the gearbox oil as measured by said first gearbox-oil sensing means.

* * * * *